United States Patent [19]

Ingram

[11] 4,270,681
[45] * Jun. 2, 1981

[54] SLIDABLE BRACKET FOR ARTICLE CARRIER

[75] Inventor: Charles E. Ingram, Warren, Mich.

[73] Assignee: Four Star Corporation, Troy, Mich.

[ * ] Notice: The portion of the term of this patent subsequent to Jan. 2, 1996, has been disclaimed.

[21] Appl. No.: 967,568

[22] Filed: Dec. 8, 1978

Related U.S. Application Data

[63] Continuation-in-part of Ser. No. 836,966, Sep. 27, 1977, Pat. No. 4,132,335.

[51] Int. Cl.³ .............................................. B60R 7/00
[52] U.S. Cl. ................... 224/321; 224/326; 410/104; 410/102
[58] Field of Search ............... 224/315, 319, 321, 324, 224/325, 326; 248/499, 222.1, 222.3, 223.4, 224.1, 224.2; 105/482; 403/331

[56] References Cited

U.S. PATENT DOCUMENTS

| Re. 26,538 | 3/1969 | Bott | 224/326 X |
|---|---|---|---|
| 2,736,272 | 2/1956 | Elsner | 105/482 |
| 2,859,710 | 11/1958 | Elsner | 248/223.4 X |
| 3,241,501 | 3/1966 | Watts | 105/482 |
| 3,344,746 | 10/1967 | Bass et al. | 105/482 |
| 4,015,760 | 4/1977 | Bott | 224/326 X |
| 4,132,335 | 1/1979 | Ingram | 224/326 X |

*Primary Examiner*—Stephen Marcus
*Attorney, Agent, or Firm*—Reising, Ethington, Barnard, Perry & Brooks

[57] ABSTRACT

A bracket for association with an article carrier, such as a luggage carrier is adapted for sliding adjustment or positioning in a carrier track. The bracket includes a tool-operated locking mechanism for locking the bracket anywhere along the length of the track wherein unauthorized adjustment of the bracket is prevented. The bracket may include suitable openings which receive tie-down straps or the like. The bracket is, also, contemplated as including suitable projections for detachably mounting a cross-strap thereto.

1 Claim, 5 Drawing Figures

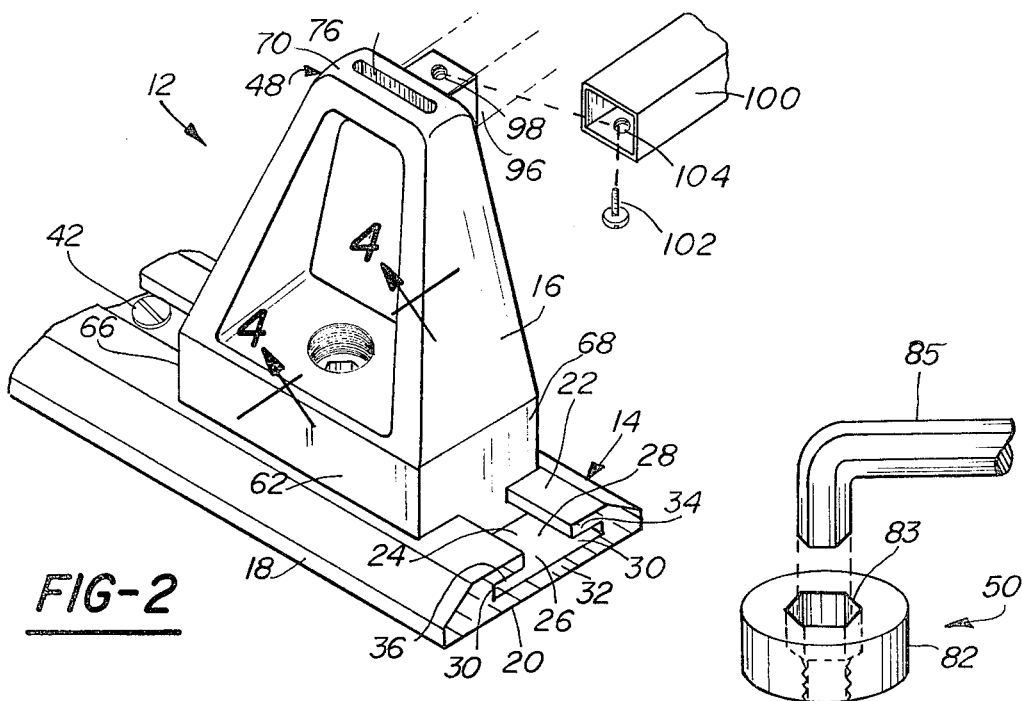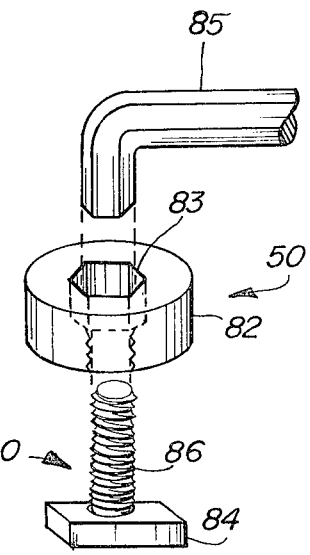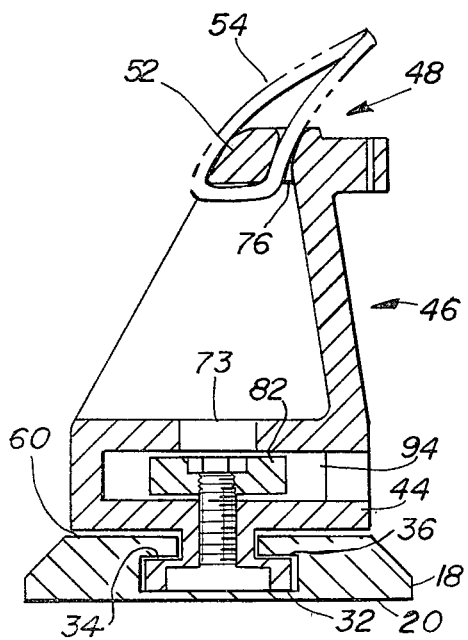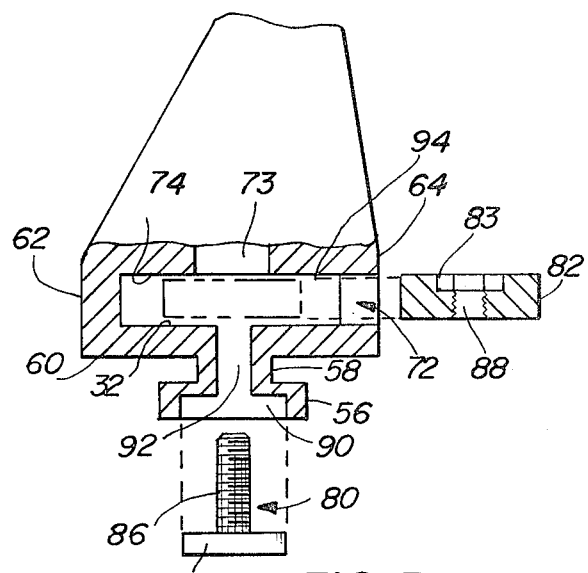

SLIDABLE BRACKET FOR ARTICLE CARRIER

CROSS REFERENCE TO RELATED APPLICATIONS

This application is a continuation-in-part application of copending U.S. Pat. application Ser. No. 836,966 filed Sept. 27, 1977 for a "Slidable Bracket for Article Carrier", now U.S. Pat. No. 4,132,335 the disclosure of which is hereby incorporated by reference.

BACKGROUND OF THE INVENTION

I. Field of the Invention

The present invention pertains to an adjustable bracket for article carriers. More particularly, the present invention pertains to an adjustably positionable bracket for vehicle-related article carriers. Even more paticularly, the present invention concerns adjustably positionable brackets for vehicle-associated luggage racks, ski racks or other article carriers, having a locking means that is tool operated preventing the unauthorized adjustment of the bracket.

II. Prior Art

In the above-referred to copending application there is disclosed a vehicle associated article carrier, such as a luggage rack, ski rack or the like which incorporates certain slidably adjustable brackets therewith. According to the application the brackets are variably positionable along the length of a slotted track formed in an associated slat of the article carrier.

The brackets of the copending application, generally, comprise an upper section which is disposed above the slat, a lower section which is engageable with the track and slidable therewithin and means for urging a member into locking engagement with a base formed in the track. A review of the application indicates that an external manually operable element such as a rotatable disc, or clasp is employed to urge the aforesaid member into locking engagement. The deployment of the manually operable element lends the bracket susceptible to unauthorized movement with the potential of damage to articles carried by the article carrier. The present invention, as will subsequently be detailed seeks to overcome this problem.

SUMMARY OF THE INVENTION

In accordance with the present invention, there is provided an ajustably positionable bracket for article carrier, wherein the bracket cannot be moved without the use of a tool. The bracket hereof, generally, comprises:

(a) means for variably, adjustably positioning the bracket along a track provided in an article carrier, (b) an upper section interconnected to the positioning means, the upper section comprising means for receiving the ends of a tie-down strap or similar device for securing an article to the bracket, the upper section, optionally, incorporating means for detachably securing a cross-strap thereto, and (c) a tool operated locking means for locking the bracket in position.

As contemplated by the practice of the present invention, the bracket hereof comprises a slide plate or base adapted to be slidingly disposed in a track or channel formed in the article carrier. The base comprises the means for variably, adjustably, positioning the bracket. The upper section includes an opening through which is laced a tie-down strap or the like. In an alternate embodiment of the present invention, the upper section incorporated a projection to which is detachably mounted a cross-strap. In a further embodiment of the present invention, the upper section comprises the opening as well as the cross-strap mounting projection.

The locking means hereof includes a key which is threadably secured to a rotatable disc and which extends through the positioning means. The disc is rotatable by means of a removable tool which mates with and engages a tool engaging aperture in the center of the disc. As the disc is rotated in a first direction, the key is urged into engagement with the base of the track to lock the bracket in position. Rotation of the disc in the counter direction disengages the key from the track base to permit movement of the bracket.

In a preferred embodiment of the present invention the bracket hereof is slidably mounted in a vehicle mounted article carrier slat having a track or channel formed therein.

For a more complete understanding of the present invention reference is made to the following detailed description and accompanying drawing. In the drawing, like reference characters refer to like parts throughout the several views, in which:

BRIEF DESCRIPTION OF THE DRAWING

FIG. 2 is an enlarged, perspective view of the bracket from the preferred embodiment of the present invention;

FIG. 3 is a perspective view of the key, the tool, and disc used for locking the bracket in place;

FIG. 4 is a cross-sectional view of the bracket hereof taken along line 4—4 in FIG. 2; and FIG. 5 is an exploded view of part of FIG. 4.

DESCRIPTION OF THE PREFERRED EMBODIMENT

Figure 1:
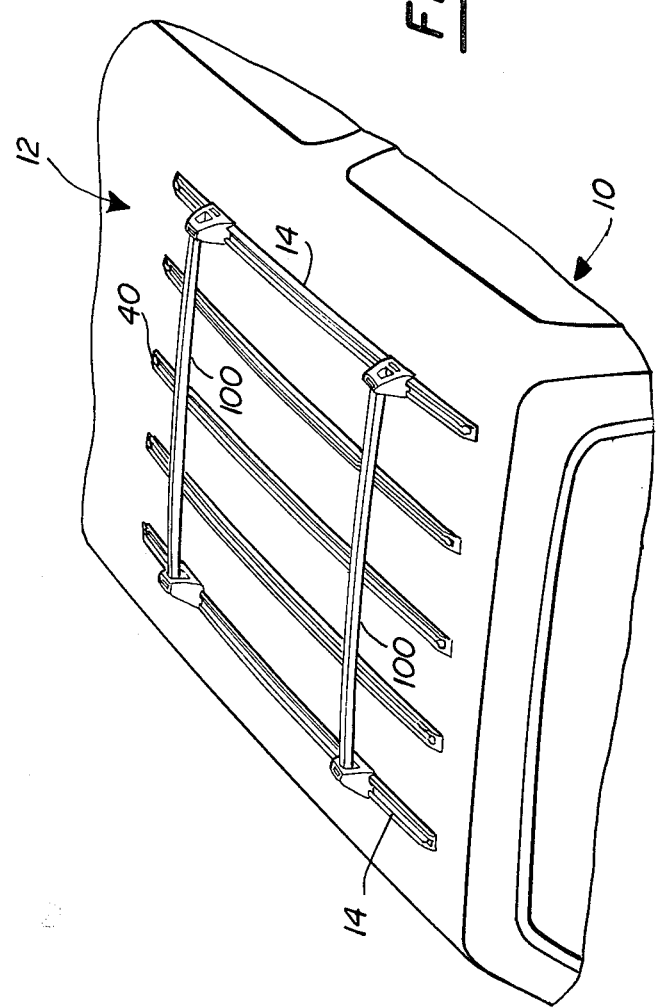
FIG. 1 is a broken, perspective view of a vehicular associated article carrier incorporating a preferred embodiment of a bracket in accordance with the present invention.

Now, and with reference to the drawing, there is depicted therein a bracket in accordance with the present invention as well as an article carrier incorporating the bracket hereof. The bracket hereof, generally, comprises an adjustably positionable bracket, wherein unauthorized adjustment of the bracket is prevented, which includes:

(a) a base for variably adjustably positioning the bracket along the extent of an article carrier, (b) an upper section interconnected to the base, the upper section comprising means for receiving an article retainer, and (c) means for releasably locking the bracket in position, the locking mechanism being tool operated preventing unauthorized adjustment of the bracket.

The present invention further contemplates the inclusion therewith of means for detachably mounting an article carrier cross-strap between a pair of opposed brackets on either side of the vehicle roof.

Furthermore, and at the outset, it should be noted that, as used herein and in the appended claims, the term "article carrier" contemplates a luggage rack, ski rack or similar type of vehicle-related or associated device. As is known to the skilled artisan, such devices, ordinarily, contemplate a plurality of spaced apart slats which support a load or article disposed thereon. Such devices, also, adopt and incorporate side rails, and stationary and/or movable cross-straps where appropriate. If required, stanchions are utilized to support the side rails and stationary cross-straps. The article carriers are, usually, mounted to either the vehicle roof or trunk lid or deck. In the practice hereof, it is to be understood that the present invention is applicable to all such article carriers so long as the carrier, per se, can receive the bracket as is detailed subsequently.

Referring, now, to the drawing and in particular FIGS. 5–5, there is depicted therein a preferred embodiment of the present invention. In accordance herewith, there is provided a vehicle body section 10 having an article carrier 12 disposed and affixed thereon. The article carrier depicted in the drawing comprises a plurality of slats 14. The slats 14 are longitudinally extending members which are affixed to the vehicle body by any suitable mode, such as threaded fasteners (not shown) or the like.

As defined by the present invention, the article carrier 12 comprises at least one slat 14 adapted to receive a tie-down bracket 16 in accordance with the present invention. The slat 14 comtemplated for use herein, generally, comprises a member 18 having a substantially planar lower surface 20. The surface 20 is designed to be contiguous with the vehicle body when affixed thereto. The upper surface 22 of the slat 14 is provided with bracket-receiving means 24. The bracket receiving means 24 comprises a channel 26. The channel or track 26 in a preferred embodiment includes a longitudinal slot 28 formed substantially along the extent of the upper surface and is formed downwardly therefrom. The slot 28 is in registry with and opens up into an enlarged guidepath 30. The guidepath is coextensive with the slot 28. The guidepath 30 includes a bottom wall 32 which defines a seat for the bracket 16 in a manner to be described subsequently. The junction between the slot 28 and the guidepath 30 is defined by a pair of opposed inwardly directed shoulders 34, 36, respectively. As will subsequently be described, the wall 32 and the shoulders 34, 36 cooperate to retain the bracket 16 in fixed position when the bracket is placed in a locked position.

It should be noted that the slat 14 can comprise, a formed sheet metal member, a solid or hollow interior extrusion or the like, as desired. The criticality to be attached to the slat is that it be provided with the longitudinally extending channel 26. Also, the slat 14, further, comprises means 38 for limiting the longitudinal movement of the bracket 16 in the track 26. For example, the limiting or stop means 8 can comprise an end cap 40 journalled onto one end of the strap 14. Alternatively, an obstruction such as an oval head screw 42 can be disposed in the channel 26, as shown. The obstruction disrupts the path of travel of the bracket to prevent passage therepast.

As heretofore noted, the slat 14 receives the bracket 16. The bracket 16 comprises (a) a base section 44 for adjustably positioning the bracket along the extent of the track 26, (b) an upper section 46 integral with the base, the upper section comprising means 48 for receiving an article retainer, generally, denoted at 48, and (c) means for releasably locking the bracket in position. The bracket 16 hereof may, also, comprise means 52 for detachably mounting an article carrier cross-strap 54 thereto.

With more particularity, the base section 44 is slidably movable in the track 26. Thus, the base section is configured analogously to the track 26. The base section includes a lower body 56 analogously configured to, but being dimensionally slightly less than that of the guidepath 30. This dimensioning enables the lower body 56 to be slid, with facility, along the length of the guidepath.

A shank 58 projects upwardly from the lower body 56 and is integrally formed therewith. The shank 58 is disposed substantially perpendicular to the lower body and centrally thereof. The shank 58 is coextensive with the lower section along the longitudinal extent thereof. The shank 58 has a width slightly less than that of the slot 28 and projects thereabove, as shown.

It is to be appreciated that the base defines means for variable adjustably positioning the bracket, per se, along the extent of the track.

The upper section 46 is integrally formed with the base section 44 and is united therewith at the junction of the shank 58 with the lower end of the upper section 46. The upper section is substantially equal in length to the base. As shown in the drawing, the upper section has an irregular configuration and comprises means, generally, denoted at 48 for receiving an article retainer.

More specifically, the upper section includes a lower end 60. The lower end 60 is configured analogously to that of the upper surface of the slat 14. This is done for load bearing distribution over the entire width of the slat. Upstanding from the lower end are a pair of opposed, side walls 62, 64, respectively, and a pair of opposed end walls 66, 68 respectively. The side walls and end walls are integrally formed to define a unitary structure for the upper section. A top wall 70 encloses the structure.

As clearly shown in FIGS. 4 and 5, the side wall 64 has a frontal opening 72 formed therein which opens into communication with the interior 73 of the upper section. A ledge 74 extends between the end walls and is disposed parallel to the top wall 70 of the upper section for purposes of facilitating handling of an article retainer.

The means 48 comprises an opening 76 formed in the top wall 70. The opening 76 is an elongated slot or the like which registers with the interior 73 of the upper section. An article retainer, such as a tie-down strap 54 is insertable through the opening 76 and foldable back upon itself through the opening 72, as shown. Alternatively, the tie-down strap 54 can be attached to the topwall 70 by any suitable means including rivets, threaded fasteners, adhesive bonding or the like. Furthermore, the means 48 can be defined by a loop integral with the top wall, or other strap retaining or receiving means. Thus, it is to be perceived that an article, such as a bicycle, luggage or the like can be placed upon the carrier 12, and tied down with the straps 54 which are threaded through the openings provided in the brackets 16. The brackets 16 are adjustably positionable by sliding same in the tracks formed in the slats.

Referring, again, to the drawing, as heretofore, noted, in order to set the bracket in any position along the length of the associated track, the present invention further comprises means 50 for releasably locking the bracket 16 in position. The locking means 50, generally, comprises a locking key 80 and a rotatable disc 82 threadably interconnected to the wedge.

The key 80 is defined by a solid body 84 and a threaded shaft 86. The shaft 86 has a threaded profile formed about the periphery thereof. The shaft 86 is integrally formed with the solid body 84 and projects outwardly therefrom.

The disc 82 has a tool engaging aperture 83 formed at its center and projecting for a distance internally into the disc. A central bore 88 is in registry with the aperture 83 and extends through the disc, as shown. The internal periphery of the disc about the central bore is provided with a threaded profile. The threaded profile of the shaft is complementary to that of the periphery of the bore 88. Furthermore, the diameter of the bore 88 is substantially equal to that of the shaft. Thus, the shaft and the bore 88 cooperate to define means for threadably interconnecting the disc and the key.

In mounting the locking means a pair of registering openings are utilized. As shown in FIGS. 3 and 4, the lower body 56 has an upwardly directed keyway 90 formed therein. The keyway has a height substantially equal to that of the body 84 to enable the body to nest therewithin. The shank 58 is provided with a bore 92 through which the shaft 86 projects. The bore 92 is in registry with a slot 94 formed in the upper section 46, preferably, below the ledge. The slot accomodates the rotatable disc therewithin. The ledge 74 has an opening 73 therethrough which is concentric with the bore 92 and smaller than disc 82 but larger than the opening 83.

It is to be appreciated that the locking means is mounted by inserting the key into the keyway and the disc into the slot, aligning the shaft with the disc opening and, threadably, interconnecting the disc and the shaft by means of a removable tool 85 which mates with the tool-engaging aperture 83.

The locking mechanism functions by emplacing the bracket in the track and sliding same to the deisred position. Thereafter, the disc is rotated in a first direction with the tool 85. Rotation of the disc urges the key downwardly into engagement with the bottom wall 32 of the track guidepath 30. This wedges and locks the lower body between the bottom wall 32 and the opposed shoulders 34, 36. Rotation of the disc with the tool in the opposite direction withdraws the wedge into the keyway, thereby releasing the wedge from engagement with the bottom wall 32. Thus, the bracket is free to be slid in the track.

Referring, again, to the drawing and in particular FIGS. 2 and 3, it will be noted that the end wall 66 is a solid wall extending from the lower section to the top wall. Projecting laterally outwardly therefrom and substantially perpendicular thereto is a cross-strap mounting member 96. The mounting member 96 has a threaded throughbore 98 formed therethrough. The member 96 is dimensioned and configured to receive an end of a cross-strap 100 thereon. A fastener, such as a bolt 102 threadably interconnects the cross-strap 100 to the bracket 16 via an opening 104 formed in the cross-strap and which registers with the throughbore 98. Thus, and in accordance with the embodiment of the invention, the bracket, also, defines means for positioning a cross-strap for a luggage rack or similar article carrier. The cross-strap can also be attached to the bracket by other mounting means including a threaded rod extending from the end of the cross-strap to engage a mating threaded aperture in the upper wall 70. The configuration of the remainder of the upper section can adopt either of the article retainer-receiving means described hereinabove with or without the cross-strap mounting member.

It is to be readily appreciated that the means for locking is directly incorporated into the base section hereof. Thus, as the disc is rotated in a first direction, the lower portion of key 80 is urged into engagement with the bottom wall of the guidepath thereby locking the bracket in position. Rotation of the disc in the opposite direction withdraws the lower portion from its engagement with the guidepath bottom wall.

It should be readily understood that movement of the bracket along the track will vary the tension of a strap threaded therethrough and secured to an article to be transported, such as a bicycle or the like.

It is to be appreciated that there has been described herein a tie-down bracket for an article carrier that can be readily locked in any desired position in a track formed in a slat and no unauthorized movement of the bracket is permitted without the removable tool for locking and unlocking the bracket.

Having, thus, described the invention, what is claimed is:

1. A tie-down bracket for an automotive vehicle mounted carrier having at least one slat affixed to the vehicle, the improvement comprising:
   (a) a base section engageable with the slat;
   (b) an upper section for facilitating securement of articles on the carrier;
   (c) the upper section being interconnected to the base section;
   (d) a slot formed in said upper section;
   (e) a disc disposed entirely within said slot;
   (f) a member for releasably engaging said track;
   (g) a threaded shaft connected to said member and projecting upwardly therefrom, said shaft extending through a bore in the base section, the bore in communication with the slot formed in the upper section;
   (h) said disc being threadably interconnected to the shaft, said disc having a tool engaging aperture formed therein; and
   (i) said upper section having a through-bore in communication with said tool aperture permitting access of a tool to said aperture whereby said disc may be rotated to move the shaft mounted member into locking engagement with the slat.

* * * * *